United States Patent
Zheng

(10) Patent No.: US 11,618,963 B2
(45) Date of Patent: Apr. 4, 2023

(54) METHOD FOR MAKING ULTRALOW PLATINUM LOADING AND HIGH DURABILITY MEMBRANE ELECTRODE ASSEMBLY FOR POLYMER ELECTROLYTE MEMBRANE FUEL CELLS

(71) Applicant: FLORIDA STATE UNIVERSITY RESEARCH FOUNDATION, INC., Tallahassee, FL (US)

(72) Inventor: Jian-ping Zheng, Tallahassee, FL (US)

(73) Assignee: FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 792 days.

(21) Appl. No.: 16/560,718

(22) Filed: Sep. 4, 2019

(65) Prior Publication Data

US 2020/0106107 A1 Apr. 2, 2020

Related U.S. Application Data

(60) Provisional application No. 62/739,432, filed on Oct. 1, 2018.

(51) Int. Cl.
*H01M 4/88* (2006.01)
*C25D 3/50* (2006.01)
(Continued)

(52) U.S. Cl.
CPC .................. *C25D 3/50* (2013.01); *C25D 5/18* (2013.01); *C25D 5/54* (2013.01); *C25D 7/00* (2013.01);
(Continued)

(58) Field of Classification Search
CPC ........ C25D 13/04; C25D 13/12; C25D 13/16; C25D 13/22; C25D 3/50; C25D 5/18;
(Continued)

(56) References Cited

U.S. PATENT DOCUMENTS 6,036,857 A 3/2000 Chen et al.
6,287,717 B1 9/2001 Cavalca
(Continued)

OTHER PUBLICATIONS

Gasteiger et al., "Activity benchmarks and requirements for Pt, Pt-alloy, and non-Pt oxygen reduction catalysts for PEMFCs", Nov. 5, 2004, Elsevier,Applied Catalysis B: Environmental 56 (2005), 9-35.

(Continued)

*Primary Examiner* — Victoria H Lynch
(74) *Attorney, Agent, or Firm* — Fox Rothschild LLP

(57) ABSTRACT

A method of making a catalyst layer of a membrane electrode assembly (MEA) for a polymer electrolyte membrane fuel cell includes the step of preparing a porous buckypaper layer comprising at least one selected from the group consisting of carbon nanofibers and carbon nanotubes. Platinum group metal nanoparticles are deposited in a liquid solution on an outer surface of the buckypaper to create a platinum group metal nanoparticle buckypaper. A proton conducting electrolyte is deposited on the platinum group metal nanoparticles by electrophoretic deposition to create a proton-conducting layer on the an outer surface of the platinum nanoparticles. An additional proton-conducting layer is deposited by contacting the platinum group metal nanoparticle buckypaper with a liquid proton-conducting composition in a solvent. The platinum group metal nanoparticle buckypaper is dried to remove the solvent. A membrane electrode assembly for a polymer electrolyte membrane fuel cell is also disclosed.

31 Claims, 14 Drawing Sheets

(51) Int. Cl.
| | |
|---|---|
| *H01M 4/86* | (2006.01) |
| *H01M 4/92* | (2006.01) |
| *H01M 8/1081* | (2016.01) |
| *H01M 8/1023* | (2016.01) |
| *H01M 8/1039* | (2016.01) |
| *C25D 5/54* | (2006.01) |
| *C25D 13/04* | (2006.01) |
| *C25D 7/00* | (2006.01) |
| *C25D 13/12* | (2006.01) |
| *H01M 8/1004* | (2016.01) |
| *C25D 5/18* | (2006.01) |
| *H01M 8/10* | (2016.01) |

(52) U.S. Cl.
CPC .............. *C25D 13/04* (2013.01); *C25D 13/12* (2013.01); *H01M 4/861* (2013.01); *H01M 4/8803* (2013.01); *H01M 4/8853* (2013.01); *H01M 4/926* (2013.01); *H01M 8/1004* (2013.01); *H01M 8/1023* (2013.01); *H01M 8/1039* (2013.01); *H01M 8/1081* (2013.01); *H01M 2004/8689* (2013.01); *H01M 2008/1095* (2013.01)

(58) Field of Classification Search
CPC ... C25D 5/54; C25D 7/00; H01M 2004/8689; H01M 2008/1095; H01M 4/861; H01M 4/8668; H01M 4/8803; H01M 4/8853; H01M 4/8857; H01M 4/8892; H01M 4/92; H01M 4/921; H01M 4/926; H01M 8/1004; H01M 8/1023; H01M 8/1039; H01M 8/1081; Y02E 60/50; Y02P 70/50
See application file for complete search history.

(56) References Cited

U.S. PATENT DOCUMENTS

| | | | |
|---|---|---|---|
| 7,459,121 | B2 | 12/2008 | Liang et al. |
| 8,415,012 | B2 | 4/2013 | Zheng et al. |
| 2002/0150524 | A1 | 10/2002 | Smalley et al. |
| 2003/0118907 | A1 | 6/2003 | Shiraishi |
| 2004/0197638 | A1 | 10/2004 | McElrath et al. |
| 2005/0239948 | A1 | 10/2005 | Haik et al. |
| 2006/0017191 | A1 | 1/2006 | Liang et al. |
| 2006/0207931 | A1 | 9/2006 | Liang et al. |
| 2006/0247364 | A1 | 11/2006 | Murray et al. |
| 2008/0020261 | A1 | 1/2008 | Hendricks |
| 2009/0053577 | A1 | 2/2009 | Aotani |
| 2011/0008705 | A1 | 1/2011 | Zheng |
| 2014/0004441 | A1* | 1/2014 | Cho .................... H01M 4/9083 429/480 |

OTHER PUBLICATIONS

Ku, Chung-Lin, "Nanotube Buckypaper Electrodes forPEM Fuel Cell Applications" (2007) Electronic Theses, Treatises and Dissertations. Paper 2959, <http://diginole.lib.fsu.edu/etd/2959>.

Li et al., "Carbon Nanotube Film by Filtration as Cathode Catalyst Support for Proton-Exchange Membrane Fuel Cell", Sep. 8, 2005, Langmuir 2005, 21, 9386-9389.

Zhang et al., "Electrostatic Layer-by-Layer Assembled Carbon Nanotube Mutilayer Film and its Electrocatalytic Activity for O2 Reduction", Sep. 1, 2004, Langmuir 2004, 20, 8781-8785.

Ramesh et al., "SWNT-MWNT Hybrid Architecture for Proton Exchange Membrane Fuel Cell Cathodes", May 28, 2008, J. Phys. Chem. C 2008, 112, 9089-9094.

Tang et al., "Carbon Nanotube Free-Standing Membrane of Pt/SWNTs as Catalyst Layer in Hydrogen Fuel Cells", Jul. 9, 2007, Aust. J. Chem. 2007, 60, 528-532.

Kongkanand et al., "Highly Dispersed Pt Catalysts on Single-Walled Carbon Nanotubes and Their Role in Methanol Oxidation", Aug. 3, 2006, J. Phys. Chem B, 2006, vol. 110, No. 33, 16185-16188.

Cheng et al., "Power Densities Using Different Cathode Catalysts (Pt and CoTMPP) and Polymer Binders (Nation and PTFE) in Single Chamber Microbial Fuel Cells", Nov. 23, 2005, Environ. Sci. Technol., 2006, vol. 40, No. 1, 364-369.

Saha et al. "High loading and monodispersed Pt nanoparticles on multiwalled carbon nanotubes for high performance proton exchange membrane fuel cells." Available Online Nov. 21, 2007. Elsevier. Journal of Power Sources. 177 (2008). pp. 314-322.

Hou and Reneker "Carbon Nanotubes on Carbon Nanofibers: A Novel Structure Based on Electrospun Polymer Nanofibers." Jan. 5, 2004. Advanced Materials. 2004, 16. No 1, pp. 69-73.

Bordjiba et al. "Binderless carbon nanotube/carbon fibre composites for electrochemical micropower sources." Jan. 3, 2007. Institute of Physics Publishing. Nanotechnology. 18 (2007). 035202. pp. 1-5.

Michel et al. "High-Performance Nanostructured Membrane Electrode Assemblies for Fuel Cells Made by Layer-by-Layer Assembly of Carbon Nanocolloids " Nov. 19, 2007. Advanced Materials 2007, 19 pp. 3859-3864.

\* cited by examiner

Pt/buckypaper

Nafion/Pt/buckypape (Imitation)

METHOD FOR MAKING ULTRALOW PLATINUM LOADING AND HIGH DURABILITY MEMBRANE ELECTRODE ASSEMBLY FOR POLYMER ELECTROLYTE MEMBRANE FUEL CELLS

CROSS-REFERENCE TO RELATED APPLICATIONS

This application claims priority to U.S. Provisional Application No. 62/739,432 filed on Oct. 1, 2018, entitled "A METHOD FOR MAKING ULTRALOW PLATINUM LOADING AND HIGH DURABILITY MEMBRANE ELECTRODE ASSEMBLY FOR PEMFCS", the entire disclosure of which incorporated herein by reference.

FIELD OF THE INVENTION

The present invention relates generally to polymer electrolyte membrane fuel cells, and more particularly to catalyst layers for polymer electrolyte membrane fuel cells.

BACKGROUND OF THE INVENTION

The most critical issues hindering the commercialization of polymer electrolyte membrane fuel cells (PEMFCs) are the high cost, especially cost of the precious metal, relative low performance at low Pt loading, and poor long-term durability. The cathode catalyst layers of current PEMFCs consist of three phases: a matrix of carbon black grains providing the electronic conductivity; nano-size platinum (Pt) particles supported on carbon black as catalyst; and an electrolyte network of perfluorosulfonate ionomer to ensure proton conductivity. The main source of voltage loss occurs due to the poor kinetics of the oxygen reduction at low temperatures, followed by the ohmic losses of proton and electronic transport in the catalyst layer due to inadequate contacts among carbon particles and ill-defined and ill-controlled conducting paths. Serious problems arise from the oxygen transport at higher current densities due to the flooding of pores in the catalyst layer from the build-up of water inside and are caused by a lack of pre-designed micro-scale water management capability within the layer. Poor oxygen reduction reaction (ORR) kinetics creates a need for high Pt loadings and results in high manufacturing costs. There are numerous micro-pores in the carbon black that can trap Pt nanoparticles, resulting in a failure of establishing the triple phase boundary (TPB) condition among mass transport, proton conductive, and electron conductive. This fraction of Pt is therefore not utilized since the electrochemical reactions could not occur at these sites, which cause a reduction in the overall Pt utilization. Additionally, carbon black can be corroded under the severe conditions in the cathode, resulting in low cell stability and short service life.

One of the major cost contributors to PEMFCs systems for automotive and stationary power applications is the platinum group metal (PGM) cathode electrocatalyst. This high cost is due to the high catalyst loading necessary to overcome the limitations of low ORR activity, low PGM utilization within the electrode layer, and loss of ORR activity with operating time. The United States Department of Energy 2020 goals for PGM loading and stack durability are ≤0.125 g PGM/kW and ≥5,000 operating hours, respectively. The current durability status of automotive fuel cells, as demonstrated in the DOE-EERE Technology Validation program, is ≥2,500 hours for stacks with high cathode catalyst loadings and stack costs far exceeding the DOE targets, even when projected to high volume manufacturing.

Recently, carbon nanotube (CNT) and carbon nanofiber (CNF) and combinations of these materials have been explored as catalyst supports in PEMFCs because of their unique properties, e.g. high conductivity of about $10^4$ S/cm, and large specific surface areas of up to 1300 $m^2$/g. Additionally, CNTs/CNFs have little micro-porosity and excellent resistance to electrochemical corrosion. The conventional ink process to make the cathode catalyst layer (CCL) largely suppresses Pt ORR utilization (<50%). Buckypaper is a completely new support concept and its structure not only maximizes Pt ORR utilization (>90%), but also improves PEMFC water management to prevent flooding. In addition, the buckypaper can also be used to support Pt core-shell, Pt alloys, and Pt nano-structure catalysts with high intrinsic ORR activities, which further gives buckypaper a significant potential for ultralow Pt PEMFCs. Carbon nanotube and nanofiber film-based membrane electrode assemblies are described in Zheng et al U.S. Pat. No. 8,415,012 (Apr. 9, 2013), the disclosure of which is incorporated fully by reference.

SUMMARY OF THE INVENTION

A method of making a catalyst layer of a membrane electrode assembly (MEA) for a polymer electrolyte membrane fuel cell includes the step of preparing a porous buckypaper layer comprising at least one selected from the group consisting of carbon nanofibers and carbon nanotubes. Platinum group metal nanoparticles are deposited in a liquid solution on an outer surface of the buckypaper to create a platinum nanoparticle buckypaper. A proton conducting electrolyte is deposited on the platinum nanoparticles by electrophoretic deposition to create a proton-conducting layer on an outer surface of the platinum nanoparticles. An additional proton-conducting layer is deposited by contacting the platinum nanoparticle buckypaper with a liquid proton-conducting composition in a solvent. The platinum nanoparticle buckypaper is dried to remove the solvent.

The step of contacting the platinum nanoparticle buckypaper with a liquid proton-conducting composition in a solvent can comprise at least one selected from the group consisting of the liquid drop method and the liquid dipping method.

The proton-conducting electrolyte can include at least one selected from the group consisting of Nafion, polyvinylidene fluoride (PVDF)/Nafion composite, and Nafion/silica composite. The proton-conducting layer can be from 2-10 wt %, based on the total weight of the catalyst layer. The proton conductivity of the proton-conducting layer can be from 0.01-0.2 Siemens/cm.

The buckypaper can have a porosity of from 50% to 90% before the deposition of the platinum group metal nanoparticles and the proton-conducting layer. The buckypaper layer can have a graduated porosity, with the porosity being less on a side of the buckypaper layer to abut a proton exchange membrane of the membrane electrode assembly. The porosity of the buckypaper layer can be graduated from a maximum porosity difference of 40% to a minimum porosity difference of 10%. The buckypaper can have less than 1% binder, based on the total weight of the buckypaper layer.

The platinum group metal nanoparticles can be deposited electrochemically. The platinum group metal nanoparticles can have a dimension of from 2 to 10 nm. The platinum group metal nanoparticles can be from 30 to 80% wt %, based on the total weight of the catalyst layer. The platinum group metal (PGM) nanoparticles can include at least one selected from the group consisting of platinum, platinum nickel alloy, platinum copper alloy, platinum cobalt alloy, platinum iron alloy, platinum iridium alloy, and platinum palladium alloy. The platinum group metal nanoparticles can be core-shell structures including a platinum shell and a core comprising at least one selected from the group consisting of nickel, copper, cobalt, iron, iridium, and palladium.

A membrane electrode assembly (MEA) for polymer electrolyte membrane fuel cells (PEMFCs), can include a catalyst layer. The catalyst layer can include a porous buckypaper layer comprising at least one selected from the group consisting of carbon nanofibers and carbon nanotubes, the buckypaper having an outer surface. Platinum group metal nanoparticles are provided on the outer surface of the buckypaper, and have outer surfaces. A proton-conducting electrolyte layer is deposited on outer surfaces of the buckypaper and the platinum group metal nanoparticles. The proton conducting layer comprises a first, electrophoretically deposited proton-conducting layer on the platinum group metal nanoparticles, and a second proton-conducting layer deposited by a liquid contact method on the Pt particles and the buckypaper.

The membrane electrode assembly can further include a proton exchange membrane. The membrane electrode assembly can include a second catalyst layer. The proton exchange membrane can be positioned between the catalyst layers. The membrane electrode assembly can further include two electrically conductive and porous gas diffusion layers (GDL) connected to the surface of two catalyst layers.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
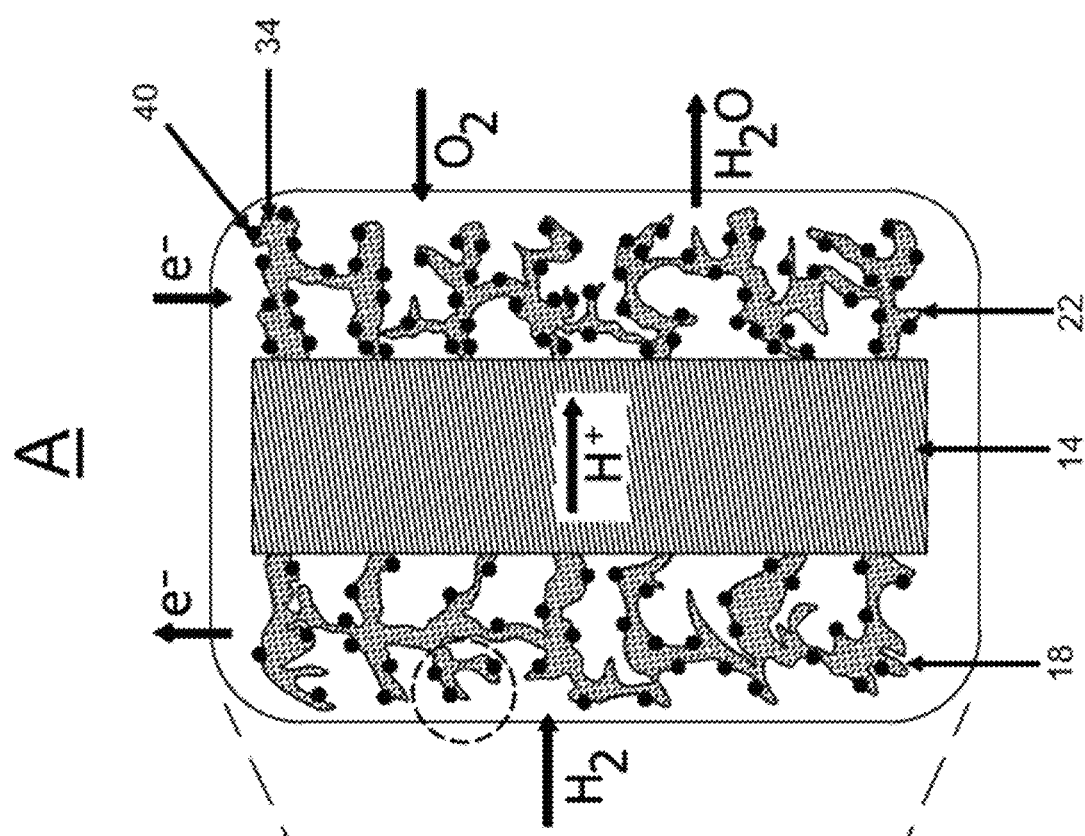
FIG. 1 is a schematic diagram, partially enlarged, of a polymer electrolyte membrane fuel cell according to the invention.
Figure 1:
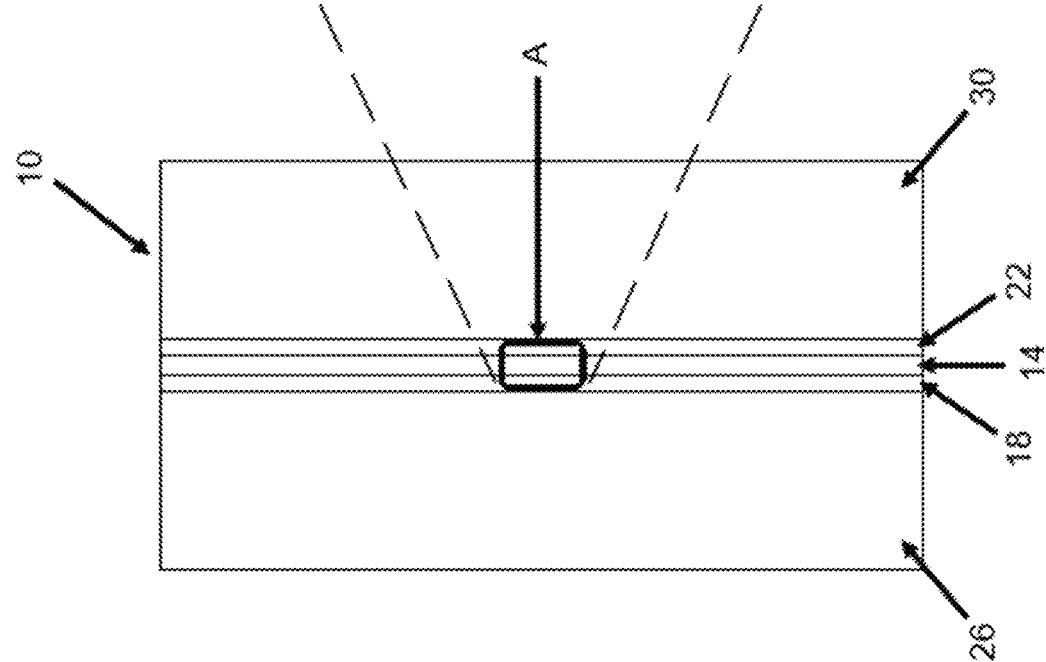

A method of making a catalyst layer of a membrane electrode assembly (MEA) for a polymer electrolyte membrane fuel cell includes the step of preparing a porous buckypaper layer comprising at least one selected from the group consisting of carbon nanofibers and carbon nanotubes. Platinum group metal (PGM) nanoparticles are deposited in a liquid solution on an outer surface of the buckypaper to create a PGM nanoparticle buckypaper. The advantages of using electrochemical deposition of the PGM are that the PGM nanoparticles can be deposited non-uniformly on the surface of CNTs and CNFs. The PGM nanoparticles are electrodeposited on the most accessible sites on the buckypaper and are not covered by either CNTs or CNFs. The electrodeposition also ensures that the PGM nanoparticles are located on the electron pathway. The PGM nanoparticle particle shape and size can be controlled in order to enhance its intrinsic ORR activity and stability. The PGM nanoparticles are typically grown in aqueous solution with salts (such as $H_2PtCl_6$) with low voltage pulses with less than 1 V. The particle size can be controlled by the pulse width, pulse duty cycle, and total pulse numbers.

A proton conducting electrolyte is deposited on the PGM nanoparticles by electrophoretic deposition to create a proton-conducting layer on an outer surface of the PGM nanoparticles. The electrophoretic deposition is the process applied to colloidal particles suspended in a liquid medium migrate under the influence of an electric field. Typically, high voltage between 100-500 V is used during electrophoretic deposition.

An additional proton-conducting layer is then deposited by contacting the PGM nanoparticle buckypaper with a liquid proton-conducting composition in a solvent. The PGM nanoparticle buckypaper is dried to remove the solvent. The step of contacting the PGM nanoparticle buckypaper with a liquid proton-conducting composition in a solvent can include at least one selected from the group consisting of the liquid dropping method and the liquid dipping method.

The proton-conducting electrolyte can be any suitable such material. The proton-conducting electrolyte can include at least one selected from the group consisting of Nafion (Chemours Company, Wilmington Del.), polyvinylidene fluoride (PVDF)/Nafion composite, and Nafion/silica composite. Other proton-conducting electrolytes are possible. The proton conductivity of the proton-conducting layer can be from 0.01-0.2 Siemens/cm. The proton conductivity of the proton conducting layer can be 0.01, 0.02, 0.03, 0.04, 0.05, 0.06, 0.07, 0.08, 0.09, 0.1, 0.11, 0.12, 0.13, 0.14, 0.15, 0.16, 0.17, 0.18, 0.19, and 0.2 Siemens/cm, or within a range of any high value and low value selected from these values.

The total weight of the proton-conducting layers can be from 2-10 wt %, based on the total weight of the catalyst layer. The proton-conducting layer can be 2, 3, 4, 5, 6, 7, 8, 9, and 10 wt. % based on the total weight of the catalyst layer, or can be within a range of any high value and low value selected from these values.

The buckypaper can have a porosity of from 50% to 90% before the deposition of the PGM nanoparticles and the proton-conducting layer. The buckypaper porosity before deposition of the PGM nanoparticles and the proton-conducting layers can be 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, and 90%, or can be within a range of any high value and low value selected from these values.

The buckypaper layer can have a graduated porosity, with the porosity being less on a side of the buckypaper layer to abut a proton exchange membrane of the membrane electrode assembly. The porosity of the buckypaper layer can be graduated from a maximum porosity difference, the difference between the porosity on the high side and the porosity on the low side, of 40% to a minimum porosity difference of 10%. The porosity difference can be 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40%, or within a range of any high value and low value selected from these values.

The platinum group metal nanoparticles can be comprised of Iridium, (Ir), Osmium (Os), Palladium (Pd), Platinum (Pt), Rhodium (Rh) and Ruthenium (Ru), and mixtures thereof. Platinum is a commonly used PGM material. The PGM nanoparticles can be deposited electrochemically. The PGM nanoparticles can have a dimension of from 2 to 10 nm. The PGM nanoparticles can have a maximum dimension of 2, 3, 4, 5, 6, 7, 8, 9, and 10 nm, or within a range of any high value and low value selected from these values. The PGM nanoparticles can be from 30 to 80% wt %, based on the total weight of the catalyst layer. The PGM nanoparticles can be 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, and 80 wt. %, based on the total weight of the catalyst layer, or can be within a range of any high value and low value selected from these values.

The platinum group metal (PGM) nanoparticles can include alloys of platinum group metals. For example, the PGM nanoparticles can comprise at least one selected from the group consisting of platinum nickel alloy, platinum copper alloy, platinum cobalt alloy, platinum iron alloy, platinum iridium alloy, and platinum palladium alloy. Other alloys are possible. The PGM nanoparticles can also be core-shell structures including a platinum shell and a core comprising at least one selected from the group consisting of nickel, copper, cobalt, iron, iridium, and palladium.

Figure 2:
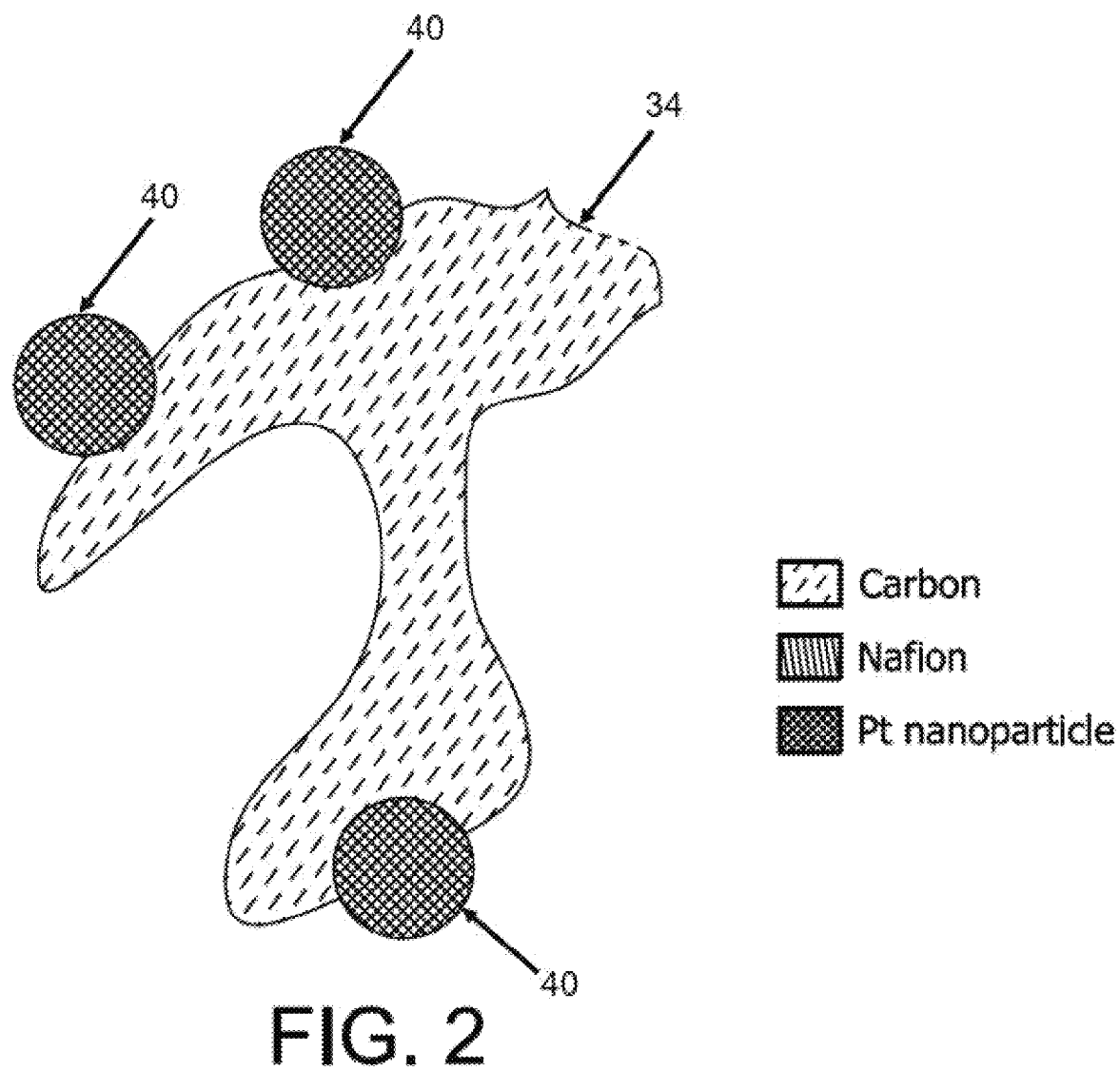
FIG. 2 is a schematic diagram of a catalyst layer with Pt particles deposited on a buckypaper substrate.

A membrane electrode assembly (MEA) 10 for polymer electrolyte membrane fuel cells (PEMFCs) is shown in FIG. 1. The MEA 10 can include a proton exchange membrane 14, catalyst layers 18 and 22 on sides of the proton exchange membrane 14, and gas diffusion layers 26 and 30. The catalyst layers 18 and 22 comprise a porous buckypaper layer 34 comprising at least one selected from the group consisting of carbon nanofibers and carbon nanotubes. The buckypaper 34 has an outer surface. PGM nanoparticles 40 are deposited on the outer surface of the buckypaper 34, as shown in FIG. 2.

Figure 3:
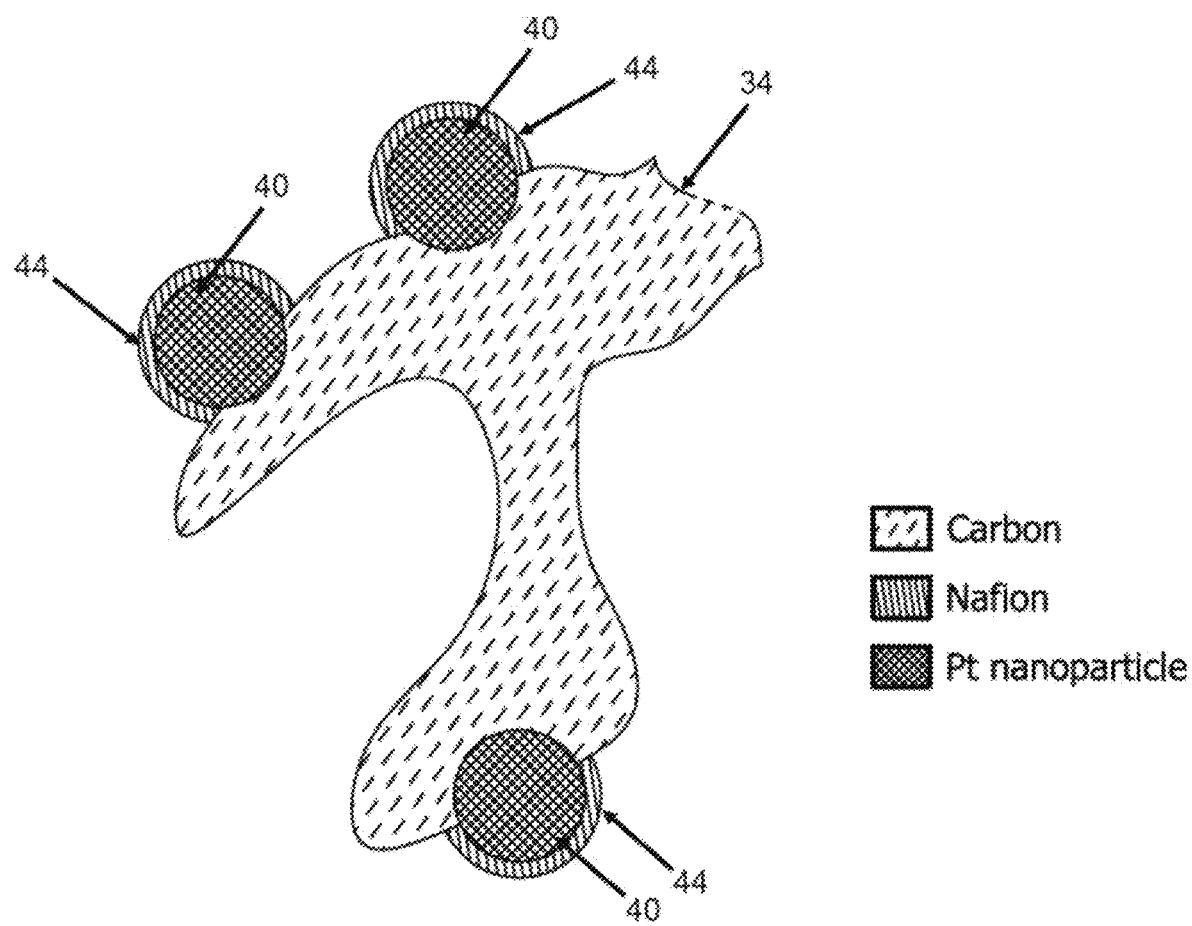
FIG. 3 is a schematic diagram of the catalyst layer of FIG. 2, with an electrophoretically deposited proton-conducting layer on the Pt particles.
Figure 4:
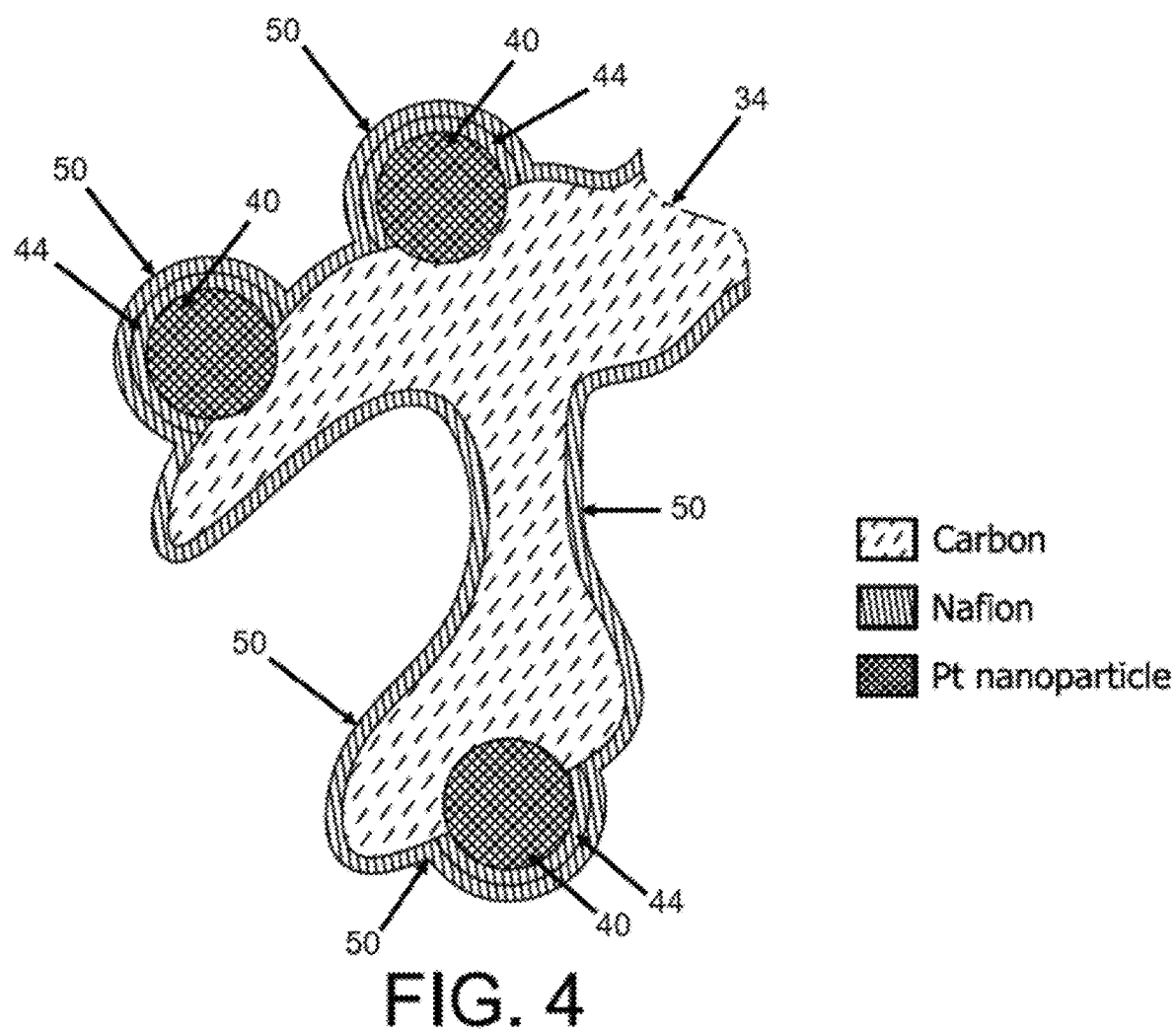
FIG. 4 is a schematic diagram of the catalyst layer of FIG. 3, with a proton-conducting layer deposited by a liquid contract method on the Pt particles with the electrophoretically deposited proton conducting layer, and also on the buckypaper.

Proton conducting electrolyte layers are deposited on outer surfaces of the buckypaper 34 and the PGM nanoparticles 40. A first, electrophoretically deposited proton-conducting layer 44 is deposited electrophoretically on the PGM nanoparticles, as shown in FIG. 3. The electrophoretic deposition process is a charge exchange deposition process that favors deposition on the PGM nanoparticles over the carbon of the buckypaper, because the PGM nanoparticles and the proton conducting electrolyte are electronically more conductive. A second proton conducting layer 50 is deposited by a liquid contact method on the PGM nanoparticles 40, on the first electrophoretically deposited proton conducting layer 44 and also on the buckypaper 34, as shown in FIG. 4. There are shown and described a single electrophoretically deposited proton conducting layer 44 and liquid contact deposited proton conducting layer 50, however, multiple such layers could be deposited. Also, the proton conducting material that is deposited by an electrophoretic deposition process and by the liquid contact process can be the same proton conducting material, or can be different proton conducting materials. The construction and materials of the catalyst layer 18 on one side of the proton exchange membrane 14 can be the same or different from the materials and construction of the other catalyst layer 22. The catalyst layer of the invention can be the cathode catalyst layer.

The proton exchange membrane 14 can be constructed in known fashion. The proton conducting material used to form the proton exchange membrane 14 can be the same proton conducting material used to coat the PGM nanoparticles 40 in the electrophoretic deposition process, or deposited on the PGM nanoparticles and the buckypaper 34 by the liquid contact process, or the proton conducting material used to form the proton exchange membrane can be a different material. A common material used in proton exchange membranes is Nafion.

The electrically conductive and porous gas diffusion layers (GDL) 26 and 30 can be connected to surfaces of the two catalyst layers 18 and 22, respectively. The gas diffusion layers can have any suitable construction, and can be made from known materials. The gas diffusion layer can be a single layer or multiple layers. A single layer of the GDL can be made with carbon fibers, carbon tubes, or their mixture. Multiple layers of GDL can be made based on a single layer of GDL, with an added a layer of carbon black. The layer of carbon black can be a micro porous layer and can provide a lower porosity than a GDL without the carbon black layer.

This invention provides an improved membrane electrode assembly (MEA), in which the most of platinum group metal (PGM) catalytic particles are located at sites that satisfy the triple-phase boundary (TPB) condition and maximize the PGM usage. The catalytic layer can be made with free-standing buckypaper consisting of carbon nanotubes (CNTs) and/or carbon nanofibers (CNFs) as support. The buckypaper can be constructed using the filtering method without any binder. The unique microstructure and well-connected nanotube network ensures a high electron conductivity. The PGM nanoparticles are deposited electrochemically in a liquid solution on the outermost surface area of an established porous CNT/CNF buckypaper network such that the locations of these nanoparticles are accessible by both electrons and gas. The surfaces of the deposited PGM nanoparticles and buckypaper network are coated in a layer of Nafion electrolyte using electrophoretic deposition (EPD) in a Nafion monomer solution and combined with a liquid contact method such as the liquid dropping or liquid dipping method, in order for the PGM nanoparticles to be accessible by protons. One major advantage of using buckypaper as support is that the platinum (Pt)/buckypaper cathode shows greater durability in electrochemical oxidation than the Pt/carbon cathode, which is due to the higher corrosion resistance of buckypaper because of its high graphitization degree. The high porosity of buckypaper also improves the mass transfer process within the catalyst layer resulting in better Pt utilization.

The buckypaper microstructure can be tailored to a gradient-structure so that PGM nanoparticles have higher density at the membrane and lower density at the air side to match the proton distribution in the catalytic layer. The porosity of the buckypaper can be controlled to be higher at the air side and lower at the membrane side to optimize the mass transfer in the catalytic layer. This will help to avoid "flooding" related issues.

The invention is based on the concept that that the activity, stability, utilization, and high current density performance of low PGM, PGM-alloy-nanoparticle-based cathode electrocatalyst layers can be greatly enhanced by controlling the distribution of the PGM alloy nanoparticles and ionomer, and by introducing highly graphitic structured carbon nanotube supports with a porosity gradient. Introducing PGM alloy enhances its intrinsic ORR activity. Controlling the distribution of PGM alloy nanoparticles and ionomer improve catalyst utilization. Using a highly-graphitic structured carbon support enhances reactant access and improve support stability against oxidation.

The buckypaper has a unique microstructure of well-connected nanotubes and nanofibers that ensures a high conductivity pathway for electrons. The buckypaper is mechanically and chemically stabile without any binder, and the specific surface area and porosity of the buckypaper can be controlled by changing the ratio between the number of MWMTs and CNFs as well as the diameters of MWMTs and CNFs.

The membrane electrode assembly (MEA) for a fuel cell can include a catalyst layer comprising a plurality of catalyst nanoparticles disposed on buckypaper. The catalyst layer can include 1 wt-% or less binder based on the total weight of the catalyst layer following deposition of the catalyst nanoparticles. The catalyst layer can include 0.5 wt-% or less binder, or 0.25 wt-% or less binder, or 0.1 wt-% or less binder, or 0.05 wt-% or less binder, or the catalyst layer can include no binder following deposition of the catalyst nanoparticles.

As used herein, "binder" is used to refer to compounds and compositions used to create adherence between the nanofilaments forming the buckypaper that are added during the formation of the buckypaper. Exemplary binders include perfluorinated polymers, such as those sold by E. I. Du Pont De Nemours and Company under the TEFLON mark, and perfluorinated, sulfonic acid resins, such as those sold by E. I. Du Pont De Nemours and Company under the NAFION mark.

As used herein, "buckypaper" is used to refer to a film-like, stable composite comprising a web of single-wall carbon nanotubes, multi-wall carbon nanotubes, carbon nanofibers, or a combination thereof. In the embodiments disclosed herein, the buckypaper can be stabilized largely by entanglement of flexible single-wall nanotubes and small diameter multi-wall nanotubes around larger, more rigid nanofibers and the large diameter multi-wall nanotubes.

As used herein, the terms "carbon nanotube" and the shorthand "nanotube" refer to carbon fullerene structures having a generally cylindrical shape and typically having a molecular weight ranging from about 840 to greater than 10 million Daltons. Carbon nanotubes are commercially available, for example, from Carbon Nanotechnologies, Inc. (Houston, Tex. USA), or can be made using techniques known in the art. As used herein, the term "small diameter MWNT" refers to multiwall nanotubes having a diameter of 10 nm or less, and the term "large diameter MWNT" refers to multiwall nanotubes having a diameter of more than 10 nm. The term "large diameter CNF" refers to carbon nanofibers having a diameter of 10 nm or more. As used herein, the terms "carbon nanofilament" and "nanofilament" are used interchangeably to describe single-wall carbon nanotubes, multi-wall carbon nanotubes and carbon nanofibers.

Single-wall nanotubes can have a diameter of less than 5 nanometers and a length between 100-1000 nanometers. Multi-wall nanotubes are multi-wall nanotube structures and can have a diameter ranging from less than 10 nanometers to 100 nanometers and a length between 500 nanometers and 500 micrometers. Carbon nanofibers can have a diameter from 100 nanometers to 200 nanometers and a length from 30 to 100 micrometers.

The buckypaper can include at least two types of nanofilaments selected from single-wall nanotubes, small diameter multi-wall carbon nanotubes, large diameter multi-wall carbon nanotubes, and carbon nanofibers. The buckypaper used in the catalyst layer can include (a) single-wall nanotubes, 55 small diameter multi-wall nanotubes, or both, and (b) large diameter multi-wall nanotubes, carbon nanofibers, or both. The ratio of the nanofilaments of (a) to the nanofilaments of (b) can range from 1:2 to 1:20. In some embodiments, the ratio of (a) to (b) can range from 1:2 to 1:15, or 1:2.25 to 1:8, or from 1:2.5 to 1:6.

The buckypaper can include at least a first layer and a second layer. The first and second layers can be the same or different. The first layer can include (a) single-wall nanotubes, small diameter multi-wall nanotubes, or both, and (b) large diameter multi-wall nanotubes, carbon nanofibers, or both, and the second layer can include multi-wall nanotubes carbon nanofibers, or both.

The buckypaper microstructure can be tailored by adjusting the starting materials and nanotube dispersion to achieve a target porosity, pore size, surface area and electrical conductivity. The catalyst layer can be formed by depositing a plurality of catalyst nanoparticles on the buckypaper after the buckypaper has been formed. The buckypaper can be formed using less than 1 wt-% binder, or any smaller amount disclosed herein. By depositing the catalyst nanoparticles after the buckypaper is formed with minimal binder, the catalyst nanoparticles can be directly deposited at the most efficient sites directly on the buckypaper for maximizing the three phase reaction coefficient. Relative to conventional MEAs, the MEA according to the design disclosed herein has a higher catalyst utilization efficiency at the electrodes, a higher power output, and better resistance to oxidation, as well as longer service life.

The buckypaper can be fabricated using the steps of (1) dispersing an amount of MWNT's, CNFs, or both MWNTs and CNFs, with an amount of SWNTs in a liquid to form a 15 suspension (wherein the nanotubes separate into individual fibers or small bundles and float in the non-solvent due to the large surface area of the nanotubes and strong molecular interactions); and then (2) filtering the suspension to remove the liquid, to yield a film that includes MWNTs, CNFs, or 20 both MWNTs and CNFs, with SWNTs interspersed there-through. In another embodiment, step (2) utilizes vaporization of the liquid to remove the liquid and form the buckypaper. It is also possible to use a combination of filtration and evaporation, either sequentially or simultaneously. The vaporization or filtration process may include the addition of heat, a pressure reduction, or a combination thereof.

The liquid can be a non-solvent. As used herein, the term "non-solvent" refers to any liquid media that are essentially non-reactive with the nanotubes and in which the nanotubes are virtually insoluble. Examples of suitable non-solvent liquid media include water and volatile organic liquids, such as acetone, ethanol, methanol, and n-hexane. The liquid may be an aqueous solution, and may be an aqueous-organic liquid mixture. Low-boiling point non-solvents are typically preferred so that the non-solvent can be easily and quickly removed from the matrix material. The liquid optionally may include a surfactant (such as a non-ionic surfactant, e.g., Triton X-100, Fisher Scientific Company, N.J.) to enhance dispersion and suspension stabilization. The surfactant can be removed along with the rest of the liquid in the filtration or volatilization step.

Example

Figure 5A:
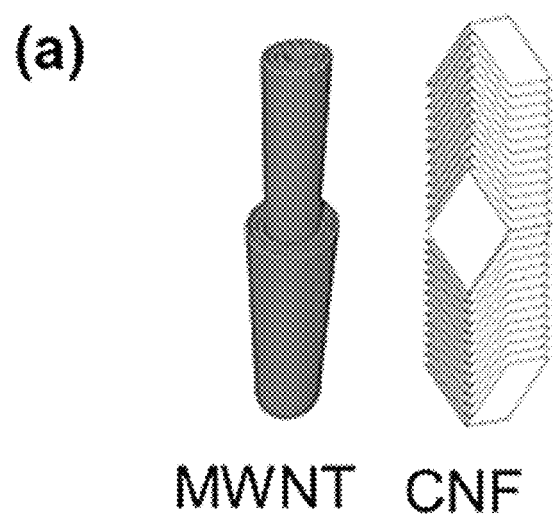
FIG. 5A is a schematic diagram of carbon nanotubes and nanofibers.

Multiwall carbon nanotube (MWNT) and carbon nanofibers (CNF) as shown in FIG. 5A were mixed and dispersed in a solution of dimethylformamide (DMF) through vigorous sonication to achieve a homogenous suspension. The DMF also plays as a surface surfactant to promote MWCT and CNF's disaggregation and uniform dispersion.

Figure 5B:
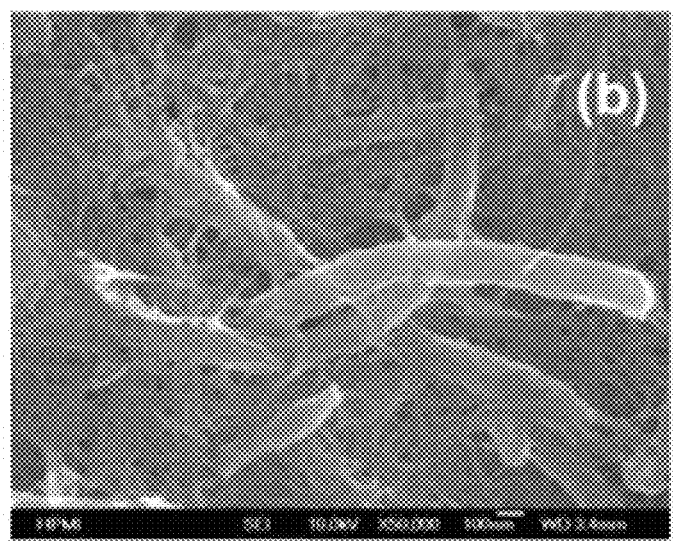
FIG. 5B is an SEM of buckypaper.
Figure 5C:
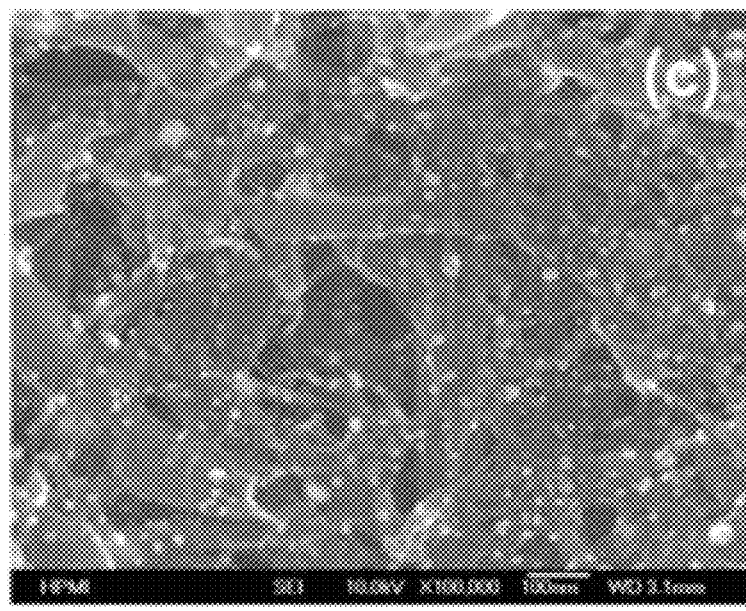
FIG. 5C is an SEM of Pt deposited on buckypaper.

The buckypaper was prepared by using the vacuum filtration method through a nylon membrane. After drying, a thin film layer was peeled from the filter membrane to produce a free-standing buckypaper as shown in FIG. 5B. Pt nanoparticles were electrochemically deposited onto the buckypaper by using a base mixture solution of 10 mM $H_2PtCl_6$, 0.1 M $H_2SO_4$, and 0.5 M ethylene glycol with $N_2$ bubbling and by applying square current pulses. The applied potential increased from 0.2 V to −0.25 V (versus the saturated calomel electrode) with a pulse width of 1 s and a pulse duty cycle of 25%. The pulse was repeated until the desired Pt loading was reached. The Pt loading was determined by weighing the mass difference before and after deposition. The loading if Pt is proportional to numbers of current pulses as shown in FIG. 5C.

Figure 5D:
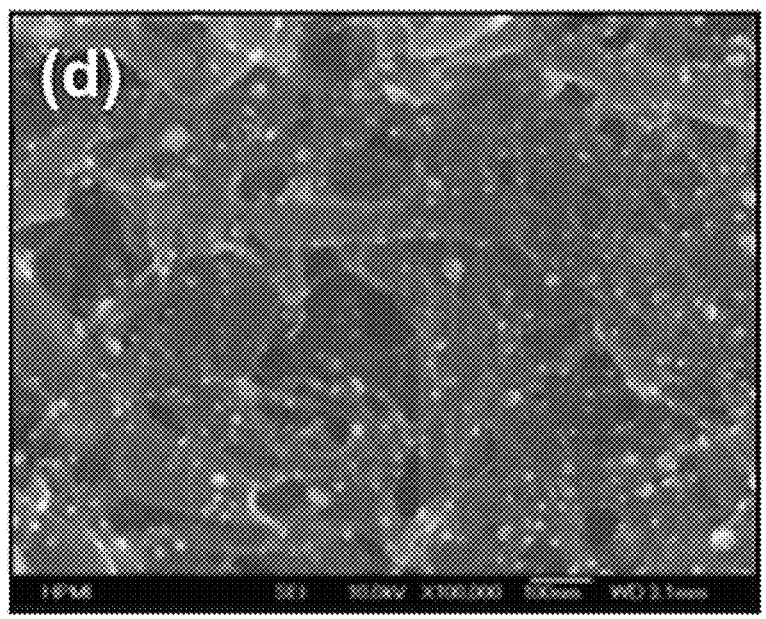
FIG. 5D is an SEM of a proton-conducting layer deposited on a Pt-loaded buckypaper.

The Nafion electrolyte is grown by electrophoretic deposition (EPD), and the resulting product is shown in FIG. 5D. Similar to electrochemical deposition, EPD is also an electron-charge exchange process that ensures that Nafion covers the Pt nanoparticles previously deposited by electrochemical deposition.

The MEA was finalized by hot pressing together the cathode gas diffusion layer (GDL), the Nafion membrane, the buckypaper anode catalyst layer, and the anode GDL with a micro porous layer. Additional Nafion solution was sprayed on the surface of catalyst layers before the hot press.

Figure 6A:
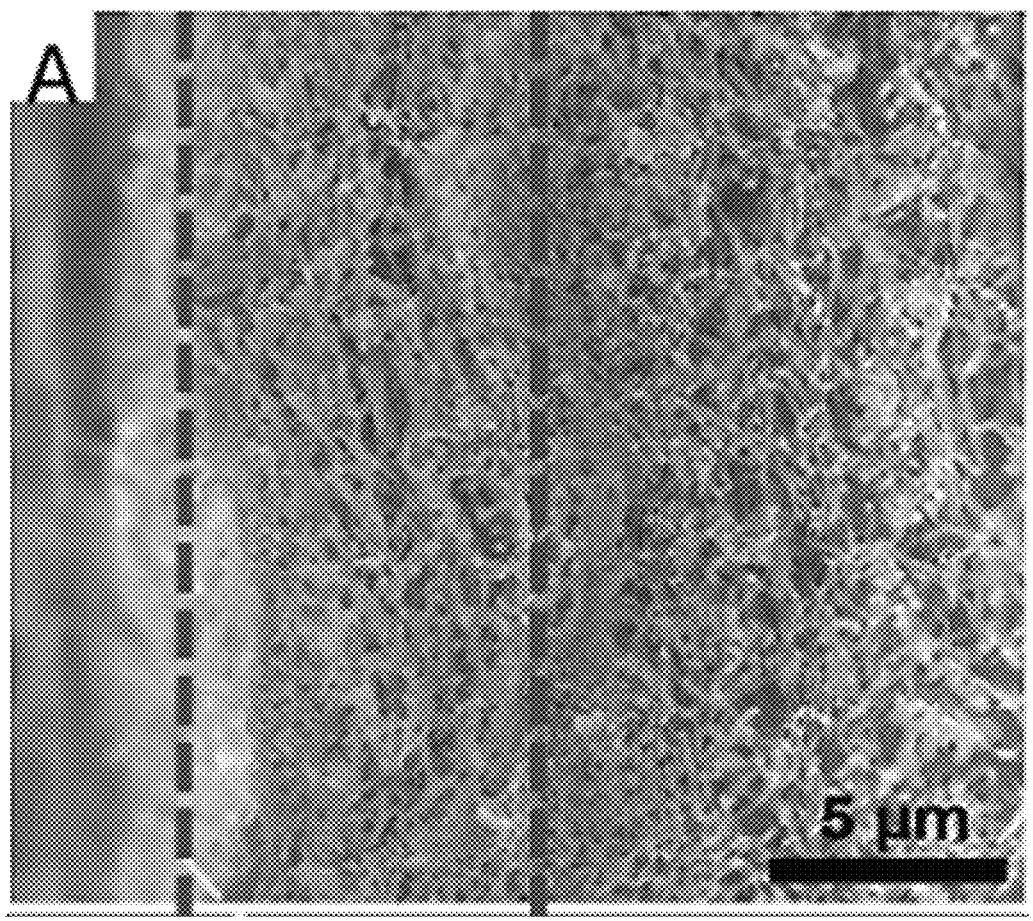
FIG. 6A is an SEM image of a cross-section of a two-layer buckypaper; the left side of the buckypaper is made of a mixture of CNTs and CNFs, while the right side is made of CNFs.
Figure 6B:
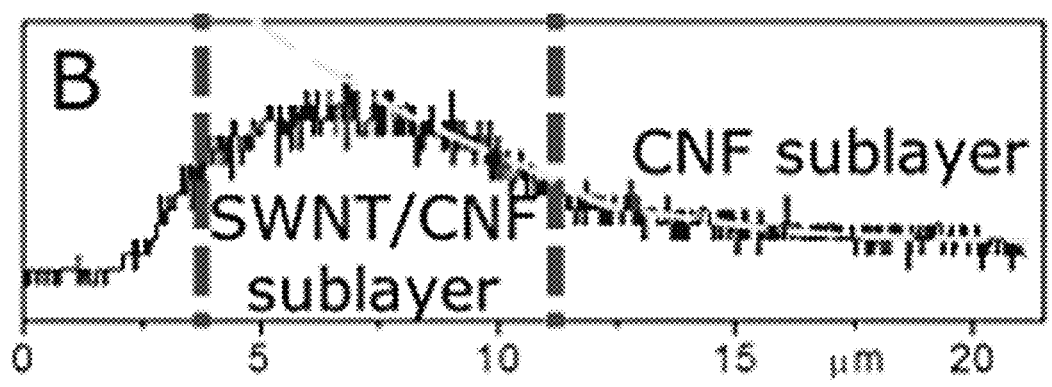
FIG. 6B is a graph showing Pt distribution along the cross-section of the buckypaper obtained by EDS analysis.
Figure 6C:
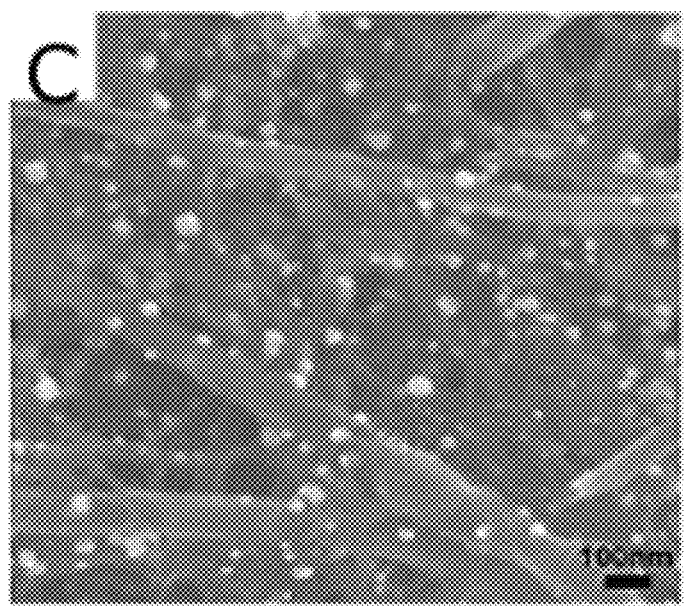
FIG. 6C is an SEM image of the surface of the CNT/CNF sublayer.
Figure 6D:
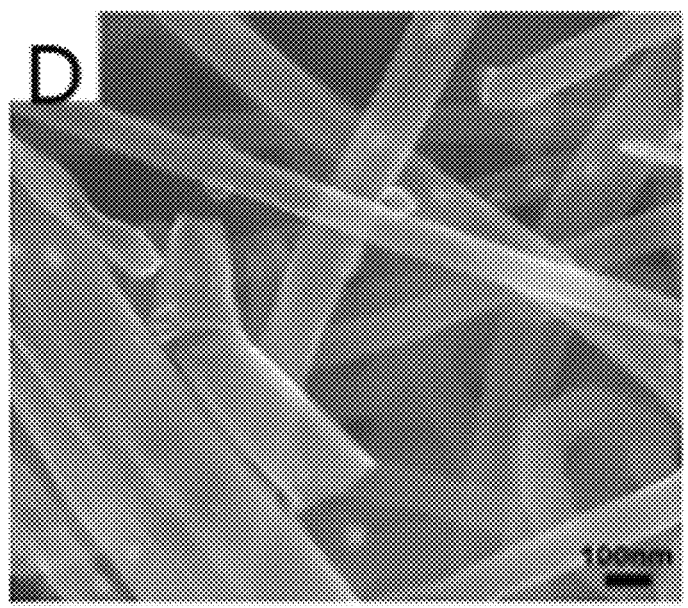
FIG. 6D is an SEM image of the CNF sublayer.
Figure 7:
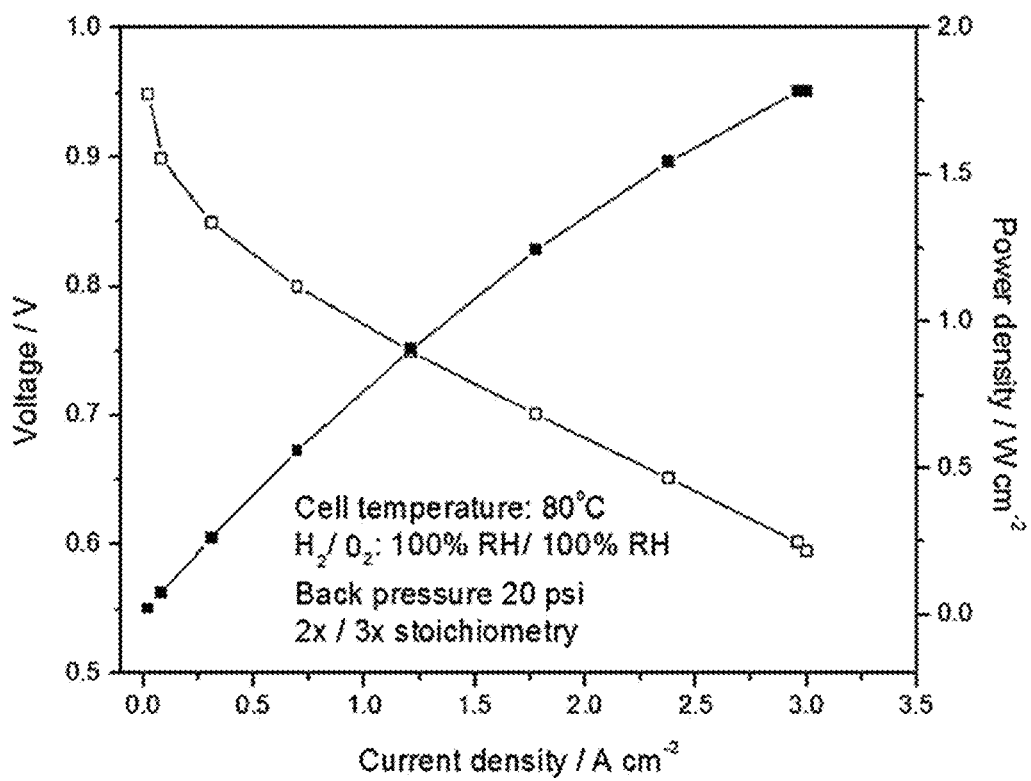
FIG. 7 is a plot of the cell potential and power density as a function of the current density for a 50 $cm^2$ MEA operating with oxygen.
Figure 8:
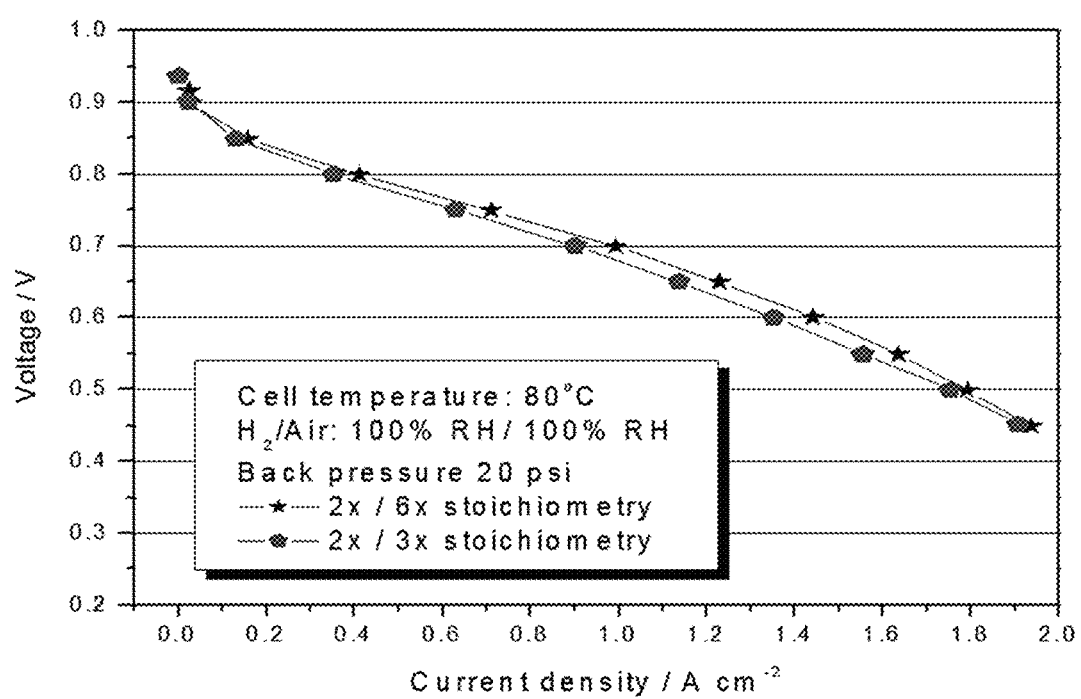
FIG. 8 is a plot of the cell potential and power density as a function of the current density for a 50 $cm^2$ MEA operating with air.

The invention has a three-dimensional electrode structure with functional gradient buckypaper, which was prepared by filtering the CNT/CNF mixture and the CNF suspension sequentially (FIG. 6A). The buckypaper was made with graded porosity with high porosity near the gas diffusion layer interface, benefiting mass transfer, and low porosity at the electrode-membrane interface, allowing high Pt loading density at this interface. Pt nanoparticles were deposited non-uniformly on buckypaper using a pulsed electrodeposition technique. The concentration of Pt particles decreased from the membrane side to the air side as shown in FIG. 6B. SEM images of the surfaces of the CNT/CNF sublayer and the CNF sublayer are shown in FIG. 6C and FIG. 6D, respectively. FIGS. 7 and 8 show the cell potential and the power density as a function of current density by using $H_2/O_2$ and $H_2/Air$, respectively. The Pt loadings at the anode and the cathode were 0.05 and 0.25 mg/cm$^2$, respectively and the operating conditions are denoted on the figures. The rated power densities are 1,500 and 800 mW/cm$^2$, the Pt utilizations are 0.167 and 0.31 $g_P$/kW for $H_2/O_2$ and $H_2/Air$, respectively. FIG. 7 and FIG. 8 were obtained from MEAs made with double layer buckypapers. FIG. 7 was obtained with an MEA tested under oxygen flow in the cathode. FIG. 8 was obtained from and MEA tested under air (about 20% oxygen) flow in the cathode Buckypaper supported Pt with a loading of 0.4 mg/cm$^2$ was used as cathode catalyst layer in the MEAs. The mass activity of Pt/BP catalyst was only 0.05 A/mg which is half of the-state-of-the-art Pt/C catalyst due to relatively large Pt particles (4-6 nm) synthesized by electrochemical deposition.

In this invention, the nano- and micro-structure of the catalyst layers were tailored in order to design an optimum gradient porosity that facilitates the electrochemical reactions and improves the cell performance. The fabricated buckypapers with gradient structure using the filtration method demonstrated a significant improvement in the power density of the PEMFCs. In order to achieve the optimum microstructure, the porosity and surface area can be controlled by selecting CNTs and CNFs with different sizes and adjusting their ratio with respect to each other. The PGM nanoparticles are electrodeposited on the most accessible sites in the buckypaper and are not be covered by either CNTs or CNFs. The nanoparticle size is determined by the deposition conditions such as time and current density. The particle density is determined by the surface area (non-uniform distribution) and density of defect sites, which is pre-etched on the CNT surface. The second structure is the binary alloy structure via electroplating. Both direct current and pulse current (PC) methods were explored, and the effect of PC waveforms, including pulse-reverse, on the coating particle composition, morphologies, average size, size distribution, and more importantly, ORR efficiency, was systematically investigated. The average particle size was found to be between 4-6 nm to ensure the durability of catalytic electrodes. The Nafion electrolyte was grown by EPD. A library of EPD process parameters such as suspension solution, working voltage, and deposition time, which can be adjusted to achieve a range of deposited compositions and coating thicknesses.

One of the major costs in fabricating PEMFC systems for automotive and stationary power applications is the cost of the PGM cathode electrode catalyst. The invention makes possible the production of a fuel cell that is more affordable and more durable, because this invention can significantly improve Pt utilization by optimization of the triple phase boundary condition. Therefore, the loading of total Pt can be reduced and the cost of MEAs as well as fuel cells will be lower. This invention also used buckypapers as the supporting material of Pt nanoparticles. The lifetime of the MEAs and fuel cells can also benefit from the good resistance to chemical corrosion of CNTs due to the surface graphitization.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

I claim:

1. A method of making a catalyst layer of a membrane electrode assembly (MEA) for a polymer electrolyte membrane fuel cell, comprising the steps of:

preparing a porous buckypaper layer comprising at least one selected from the group consisting of carbon nanofibers and carbon nanotubes;

depositing platinum group metal nanoparticles in a liquid solution on an outer surface of the buckypaper to create a platinum nanoparticle buckypaper; and, depositing a proton conducting electrolyte on the platinum nanoparticles by electrophoretic deposition to create a proton-conducting layer on an outer surface of the platinum nanoparticles;

depositing an additional proton-conducting layer by contacting the platinum nanoparticle buckypaper with a liquid proton-conducting composition in a solvent:

drying the platinum nanoparticle buckypaper to remove the solvent.

2. The method of claim 1, wherein the step of contacting the platinum nanoparticle buckypaper with the liquid proton-conducting composition in the solvent comprises at least one selected from the group consisting of the liquid drop method and the liquid dipping method.

3. The method of claim 1, wherein the proton-conducting electrolyte comprises at least one selected from the group consisting of Nafion, polyvinylidene fluoride (PVDF)/Nafion composite, and Nafion/silica composite.

4. The method of claim 1, wherein the proton-conducting layer is from 2-10 wt %, based on the total weight of the catalyst layer.

5. The method of claim 1, wherein the buckypaper has a porosity of from 50% to 90% before the deposition of the platinum group metal nanoparticles and the proton-conducting layer.

6. The method of claim 1, wherein the buckypaper layer has a graduated porosity, with the porosity being less on a side of the buckypaper layer to abut a proton exchange membrane of the membrane electrode assembly.

7. The method of claim 6, wherein the porosity of the buckypaper layer is graduated from a maximum porosity difference of 40% to a minimum porosity difference of 10%.

8. The method of claim 1, wherein the platinum group metal nanoparticles are deposited electrochemically.

9. The method of claim 1, wherein the platinum group metal nanoparticles have a dimension of from 2 to 10 nm.

10. The method of claim 1, wherein the platinum group metal nanoparticles are from 30 to 80% wt %, based on the total weight of the catalyst layer.

11. The method of claim 1, wherein the buckypaper has less than 1% binder, based on the total weight of the buckypaper layer.

12. The method of claim 1, wherein the platinum group metal (PGM) nanoparticles comprise at least one selected from the group consisting of platinum, platinum nickel alloy, platinum copper alloy, platinum cobalt alloy, platinum iron alloy, platinum iridium alloy, and platinum palladium alloy.

13. The method of claim 1, wherein the platinum group metal nanoparticles are core-shell structures including a platinum shell and a core comprising at least one selected from the group consisting of nickel, copper, cobalt, iron, iridium, and palladium.

14. The method of claim 1, wherein a proton conductivity of the proton-conducting layer is from 0.01-0.2 Siemens/cm.

15. A membrane electrode assembly (MEA) for polymer electrolyte membrane fuel cells (PEMFCs), comprising a catalyst layer, the catalyst layer comprising:

a porous buckypaper layer comprising at least one selected from the group consisting of carbon nanofibers and carbon nanotubes, the buckypaper having an outer surface;

platinum group metal nanoparticles electrochemically deposited by a liquid solution on an outer surface of the buckypaper to create a platinum nanoparticle buckypaper;

a proton-conducting electrolyte layer deposited on outer surfaces of the buckypaper and the platinum group metal nanoparticles, the proton conducting layer comprising a first, electrophoretically deposited proton-conducting layer on the platinum group metal nanoparticles, and a second proton-conducting layer deposited by a liquid contact method on the Pt nanoparticles and the buckypaper.

16. The membrane electrode assembly of claim 15, further comprising a proton exchange membrane.

17. The membrane electrode assembly of claim 16, further comprising a second catalyst layer, the proton exchange membrane being positioned between the catalyst layers.

18. The membrane electrode assembly of claim 15, wherein the proton-conducting electrolyte layer comprises at least one selected from the group consisting of Nafion, polyvinylidene fluoride (PVDF)/Nafion composite, and Nafion/silica composite.

19. The membrane electrode assembly of claim 15, wherein the proton-conducting electrolyte layer is from 2-10 wt %, based on the total weight of the catalyst layer.

20. The membrane electrode assembly of claim 15, wherein the buckypaper has a porosity of from 50% to 90% before deposition of the platinum group metal nanoparticles and the proton-conducting layer.

21. The membrane electrode assembly of claim 16, wherein the buckypaper layer has a graduated porosity, with the porosity being less on a side of the buckypaper layer abutting the proton exchange membrane of the membrane electrode assembly.

22. The membrane electrode assembly of claim 21, wherein the porosity is graduated from a high of from a maximum porosity difference of 40% to a minimum porosity difference of 10%.

23. The membrane electrode assembly of claim 15, wherein the liquid contact method comprises at least one selected from the group consisting of a liquid dropping method and a liquid dripping method.

24. The membrane electrode assembly of claim 15, wherein the buckypaper has less than 1% binder, based on the total weight of the buckypaper layer.

25. The membrane electrode assembly of claim 15, wherein the platinum group metal (PGM) nanoparticles comprise at least one selected from the group consisting of platinum, platinum nickel alloy, platinum copper alloy, platinum cobalt alloy, platinum iron alloy, platinum iridium alloy, and platinum palladium alloy.

26. The membrane electrode assembly of claim 15, wherein the platinum group metal nanoparticles are core-shell structures including a platinum shell and a core comprising at least one selected from the group consisting of nickel, copper, cobalt, iron, iridium, and palladium.

27. The membrane electrode assembly of claim 15, wherein the platinum group metal nanoparticles have a dimension of from 2-10 nm.

28. The membrane electrode assembly of claim 15, wherein the platinum group metal nanoparticles are from 30 to 80% of the catalyst layer, based on the total weight of the catalyst layer.

29. The membrane electrode assembly of claim 15, wherein a proton conductivity is from 0.01-0.2 Siemens/cm.

30. The membrane electrode assembly of claim 17, further comprising two electrically conductive and porous gas diffusion layers (GDL) connected to a surface of two catalyst layers.

31. The membrane electrode assembly of claim 15, wherein the catalyst layer is a cathode catalyst layer.

* * * * *